United States Patent [19]
Komatsu et al.

[11] 3,895,986
[45] July 22, 1975

[54] APPARATUS FOR AND METHOD OF APPLYING A STRIP OF ELASTIC MATERIAL TO A TIRE BEAD

[75] Inventors: Tasaaki Komatsu; Shinichi Arai, both of Tokyo, Japan

[73] Assignee: Bridgestone Tire Company Limited, Tokyo, Japan

[22] Filed: Sept. 20, 1974

[21] Appl. No.: 507,983

[30] Foreign Application Priority Data
Sept. 21, 1973 Japan............................ 48-106582

[52] U.S. Cl. ............... 156/136; 156/126; 156/131; 156/293; 156/229; 156/398; 156/403; 156/492; 156/494
[51] Int. Cl.² ......................................... B29H 17/32
[58] Field of Search .......... 156/136, 422, 293, 403, 156/398, 423, 492, 494, 229, 126, 131, 132

[56] References Cited
UNITED STATES PATENTS

| 1,591,130 | 7/1926 | Hutchens | 156/136 |
|---|---|---|---|
| 1,890,952 | 12/1932 | Shively | 156/422 X |
| 2,028,961 | 1/1936 | Wheeler | 156/293 X |
| 2,517,889 | 8/1950 | Kuttler | 156/423 X |
| 3,057,566 | 10/1962 | Braden | 156/422 X |
| 3,260,397 | 7/1966 | DeGier | 156/293 X |
| 3,438,108 | 4/1969 | Nash | 156/229 X |
| 3,687,779 | 8/1972 | Folden | 156/403 X |
| 3,728,194 | 4/1973 | Enders | 156/131 |
| 3,841,940 | 10/1974 | Rubinich | 156/229 |

FOREIGN PATENTS OR APPLICATIONS 23,412  8/1970  Japan............................ 156/398

Primary Examiner—Clifton B. Cosby
Attorney, Agent, or Firm—Waters, Schwartz & Nissen

[57] ABSTRACT

To apply an annular strip of elastic material to a tire bead in the process of production of an automobile tire, the strip is initially prepared in a generally cylindrical form having an axis aligned with an axis of the bead in a generally circular form and is thereafter deformed into a generally annular form having an inner peripheral edge in close contact with the outer peripheral edge of the bead so that the annular strip is securely joined to the tire bead by reason of an internal stress produced in the deformed strip.

18 Claims, 9 Drawing Figures

APPARATUS FOR AND METHOD OF APPLYING A STRIP OF ELASTIC MATERIAL TO A TIRE BEAD

The present invention relates to production of automobile tires and, more particularly, to an apparatus for and a method of applying an annular strip of elastic material to an outer peripheral edge of a wire bead to form part of an automobile tire.

The automobile tire usually has rubberized fabric plys over a rubber liner and the edge of the plys is wrapped around a wire bead or a bundle of rubber coated wires that hold the tire to a wheel rim. To prevent air from being entrapped in an annular space formed internally of the edge of the plys, it is presently a common practice to have an additional strip of elastic material joined to the outer peripheral edge of the bead and to have the resultant assembly of the bead and the elastic strip inserted into the space in the circumferential edge of the plys. The additional strip of this nature is known as a stiffener, an apex strip or a filler and usually has a generally triangular cross section to correspond to the cross section of the space in the edge of the plys unoccupied by the bead.

A variety of devices have thus far been developed to apply the strip of the elastic material to the tire bead in a automated or semi-automated fashion. None of the prior art devices have, however, proved fully acceptable because of the drawbacks inherent therein and, as a consequence, the operation to conjoin the bead and the elastic strip is still carried out by human labor which is not only time consuming but requires highly skilled techniques and years of experiences. An object of the present invention is to eliminate such drawbacks inherent in the prior art devices and to provide an apparatus for and a method of applying an annular strip of elastic material to a tire bead in automated fashion which will provide increased production efficiency and contribute to elimination of the laborious operations which have thus far been necessitated at the particular stage of production of the automobile tires.

In accordance with the present invention, there will be provided to accomplish such an object an apparatus which comprises bead holding means having a generally circular outer perimeter which has a variable diameter and around which the tire bead is to be lapped in a generally circular form, strip transfer means including a number of support members which are positioned in a substantially coaxial relationship to the bead holding means and which are movable between first angular positions operable to carry the strip of elastic material in a generally cylindrical form and second angular positions operable to carry the strip in a generally annular form in the vicinity of the outer perimeter of the bead holding means conditioned to a predetermined diameter, the above mentioned cylindrical form and the annular form having a common axis which is substantially in line with an axis of the outer perimeter of the bead holding means, and strip receiving means having an annular wall portion which has an inner perimeter extending substantially co-axially with and radially at a spacing from the outer perimeter of the bead holding means and angled to be in proximity to and in a face-to-face relation to the support members of the strip transfer means with an inner peripheral edge of the strip in close contact with the outer peripheral edge of the bead on the bead holding means.

The bead holding means may comprise a shaft which is coaxial with the outer perimeter of the bead holding means and which is axially movable in both directions, a collapsible cage supported on the shaft and having an outer peripheral end constituting the outer perimeter of the bead holding means, the collapsible cage being radially extendible or contractable about the shaft as the shaft is axially moved in either direction, and drive means for driving the shaft to axially move in either direction over a desired distance to provide a desired diameter of the outer perimeter of the bead holding means.

On the other hand, the strip transfer means may further include a shaft having an axis substantially in line with the axis of the outer perimeter of the bead holding means, a non-collapsible cage which is fixedly supported on the shaft and which has an outer perimeter which is to be located in close proximity to and radially outwardly spaced apart from the outer perimeter of the bead holding means when the support members forming part of the strip transfer means are in the previously mentioned second angular positions thereof, a collapsible cage axially movable on the shaft and radially extendible or contractable about the shaft as the collapsible cage is axially moved in either direction on the shaft, the collapsible cage having an outer perimeter which has a variable diameter which is substantially equal to the diameter of the non-collapsible cage when the collapsible cage is in a contracted condition and which is larger than the diameter of the outer perimeter of the non-collapsible cage when the collapsible cage is in an extended condition, each of the support members being pivotally connected at one end to the outer perimeter of the non-collapsible cage and at the other end to the outer perimeter of the collapsible cage so that the support members are in the previously mentioned first angular positions thereof when the collapsible cage is in the contracted condition and in the previously mentioned second angular positions when the collapsible cage is in the extended condition, each of the support members in the second angular positions having a radially inner peripheral end located in close proximity to and radially outwardly spaced apart from the outer perimeter of the bead holding means and a radially outer peripheral end located in proximity to the outer perimeter of the annular wall portion of the strip receiving means, and drive means for driving the collapsible cage to axially move in either direction on the shaft for thereby causing the collapsible cage to radially extend or contract about the shaft.

If desired, the apparatus according to the present invention may further comprise pressing means including a roller which has an inoperative condition disengaged from the strip receiving means and an operative condition which is in pressing and rolling contact with an inner peripheral portion of the strip of elastic material in the generally annular form whereby the strip of the generally annular form is pressed at its inner peripheral edge to the outer peripheral edge of the bead.

The bead holding means and the strip receiving means may be commonly supported on a first support structure and the strip transfer means may be supported on a second support structure so that the first and second support structures are movable relative to each other in a predetermined direction which is parallel to the substantially aligned axis of the bead holding means, the strip transfer means and the strip receiving means. In this instance, one of the first and second support structures may be held stationary and the other of the support structure arranged to be movable toward and away from the former. To prevent the movable support structure from being moved upward from the predetermined vertical position thereof, means may be provided which include a roller rotatable on a stationary shaft extending substantially at right angles to the direction of movement of the movable support structure and in rolling contact at its lower circumferential end with an upper face of a horizontal member forming part of the movable support structure.

On the other hand, the method according to the present invention comprises holding a continuous loop of tire bead in a generally circular form, preparing a strip of elastic material in a generally cylindrical form having an axis substantially in line with an axis of the bead of the generally circular form, positioning one peripheral edge of the strip of the generally cylindrical form in close proximity to and radially outwardly spaced apart from the outer peripheral edge of the bead and causing the strip to turn about the particular peripheral edge through an angle larger than 90 degrees for deforming the strip into a generally annular form while restraining the annular strip from being further turned about the radially inner peripheral edge thereof whereby the annular strip of elastic material is radially contracted and closely pressed at its inner peripheral edge to the outer peripheral edge of the tire bead.

The features and advantages of the apparatus and method according to the present invention will become more apparent from the following description taken in conjunction with the accompanying drawings, in which.

Figure 8A:
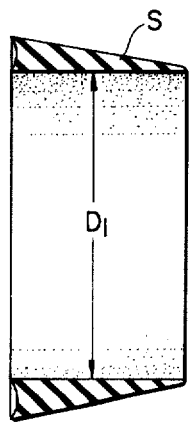
Figure 8B:
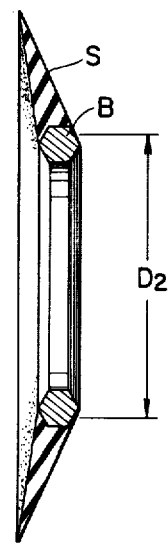

FIG. 8a is a longitudinal sectional view showing the strip of elastic material which is held in a generally cylindrical form on the strip transfer means of the apparatus embodying the present invention; and FIG. 8b is a sectional view which shows the strip which is deformed into a generally annular form from the cylindrical configuration illustrated in FIG. 8a during the operation of the embodiment of the present invention.

While the strip of elastic material processed in the embodiment of the apparatus according to the present invention will hereinafter be exemplified by a stiffener, it should be borne in mind that such is merely by way of example and, thus, the strip herein mentioned may include the apex strip or the filler which is usually in use with the wire bead in an automobile tire.

Figure 1:
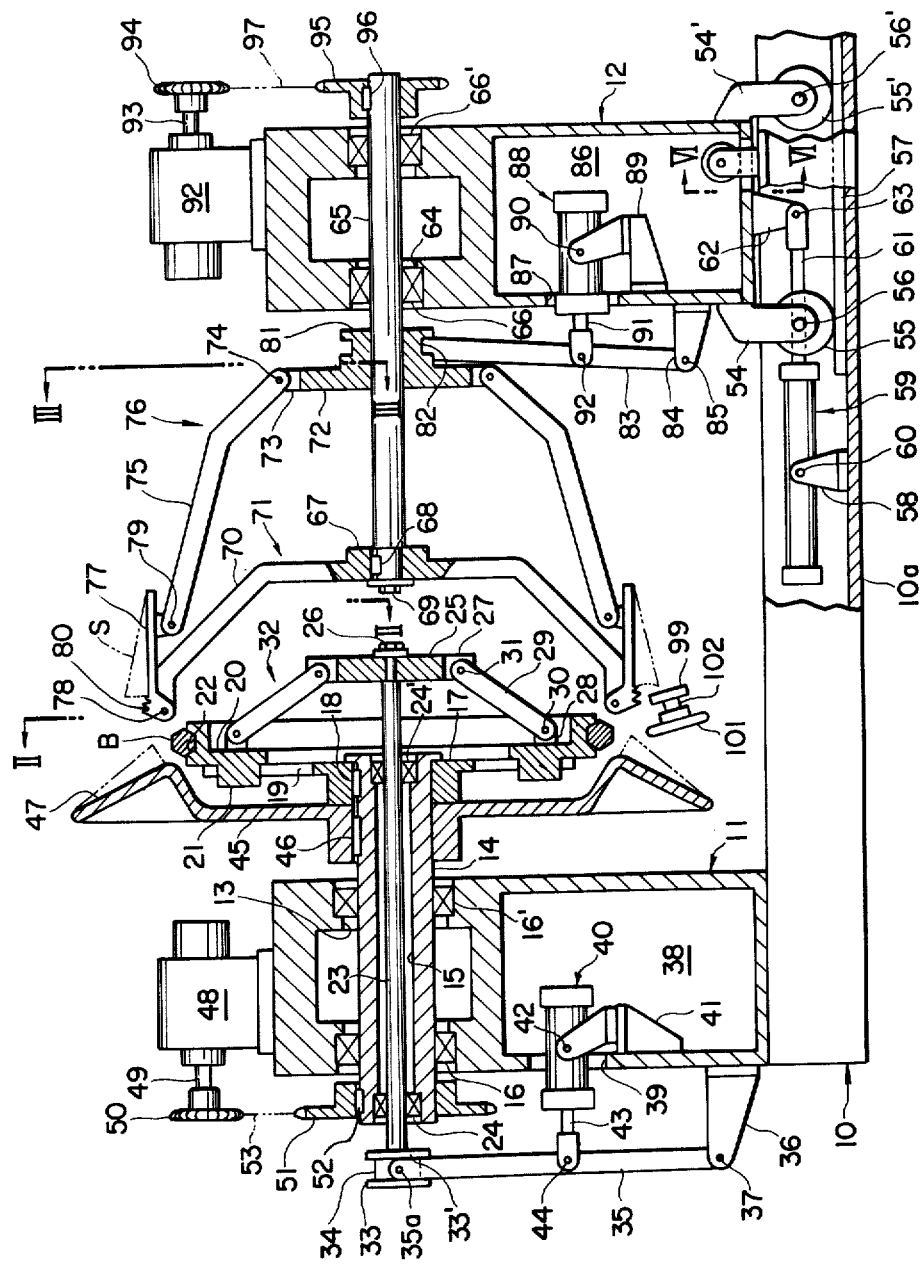
FIG. 1 is a side elevational view, partly in section, of a preferred embodiment of the apparatus according to the present invention.

Reference will now be made to FIGS. 1 to 5, especially in FIG. 1. The apparatus embodying the present invention is shown comprising a base structure 10 supporting thereon a stationary column 11 and a movable column 12 which is movable toward and away from the stationary column 11. The stationary column 11 is formed with a horizontal bore 13 located at an appropriate height over the base structure 10 and directed toward the movable column 12. A hollow shaft 14 having an axial bore 15 extends throughout the horizontal bore 13 and is rotatably supported on the column 11 through bearings 16 and 16'. The hollow shaft 14 axially projects out of the bore 13 toward the movable column 12 carries at its leading end a circular disc member 17 which is keyed or otherwise secured as at 18 to the hollow shaft 14 and which is thus rotatable about an axis of the hollow shaft 14. The circular disc member 17 has a number of radial projections (not seen in the drawings) which are substantially equiangularly spaced apart from each other so that radial grooves 19 are formed therebetween. The disc member 17 carries thereon bead retaining members 20 each of which has formed on its rear face a projection 21 slidably received in each of the radial grooves 19 so that the bead retaining members 20 are radially movable on the disc member 17 toward and away from the axis of the hollow shaft 14. Each of the bead retaining members 20 is generally fan-shaped so that the outer peripheral edges of the bead retaining members 20 as a whole provide a generally circular contour which has a center aligned with the axis of the hollow shaft 14 as will be better seen in FIG. 2. Each bead retaining member 20 further has formed in its outer peripheral edge a groove 22 which extends throughout the length of the edge and which has a cross section configured to correspond to the inner peripheral edge of an annular bead B to be processed. The projection 21 of each of the bead retaining members 20 has an enlarged end portion which is wider than the radial groove 19 so that the retaining members 20 are prevented from being dislodged from the respectively associated radial grooves 19 when the retaining members 20 are moved through the grooves 19.

Figure 2:
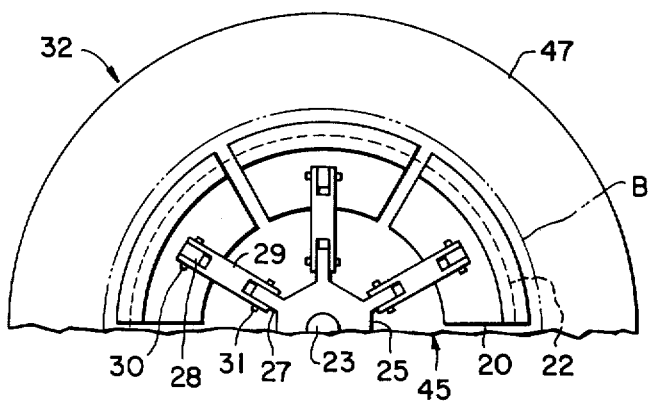
FIG. 2 is a front end view showing an upper half of an arrangement including the bead holding means and the strip receiving means of the embodiment illustrated in FIG. 1 as viewed from a position indicated by lines II—II in FIG. 1.

A shaft 23 extends throughout the length of the axial bore 15 in the hollow shaft 14 and is coaxially supported on the hollow shaft 14 through bearings 24 and 24'. The shaft 23 is not only rotatable about its axis aligned with the axis of the hollow shaft 14 but is axially movable toward and away from the movable column 12. The shaft 23 has an axial portion projecting out of the foremost end of the bore 15 in the hollow shaft 14 toward the movable column 12 and carries at its leading end a disc member 25 which is secured to the shaft 23 by suitable fastening means such as a nut 26 as shown. The disc member 25 is formed with radial projections 27 which are equiangularly spaced apart from each other and which are respectively aligned from the above mentioned bead retaining members 20. Each of the bead retaining members 20 has a bracket portion 28 projecting in an opposite direction to the projection 21 slidably received in each of the grooves 19 in the disc member 17. A link arm 29 is connected at one end to the bracket portion 28 of each bed retaining member 20 through a pivotal pin 30 and at the other end to each of the radial projections 27 of the disc member 25 through a pivotal pin 31. The combination of the disc member 25, the link arms 29, and the bead retaining members 20 constitutes, as a whole, a collapsible cage 32 which is radially collapsible toward and radially extendible away from the axis of the shaft 23. As seen in FIG. 2, the collapsible cage 32 has a generally circular outer perimeter which has a diameter which is variable depending upon the angles of the link arms 29 relative to the axis of the shaft 23, viz., the axial position of the shaft 23 relative to the hollow shaft 14.

The shaft 23 has the other axial end portion projecting out of the bore 15 in the hollow shaft 14 and carries thereon a pair of spaced parallel flanges 33 and 33' forming a circumferential groove 34 therebetween. A link lever 35 has at one end a pin 35a slidably received in this circumferential groove 34 and is connected at the other end to a bracket 36 through a pivotal pin 37. The bracket 36 is located below the flanged end portion of the shaft 23 and is rigidly connected to a lower portion of the stationary column 11 as shown. The lower portion of the stationary column 11 is internally formed with a chamber 38 which is open to the outside through an opening 39 formed in a wall portion of the column 11 in the neighbourhood of a longitudinally intermediate portion of the link lever 35. A fluid-operated cylinder 40 projects out of the chamber 38 through the opening 39 and is rockably supported by a bracket 41 through a pivotal pin 42. The bracket 41 is shown to be secured to the inner face of the wall portion of the column 11. The fluid-operated cylinder 40 has a piston rod 43 which is connected at its leading end to the intermediate portion of the link lever 35 through a pivotal pin 44. When the fluid-operated cylinder 40 is actuated so that the piston rod 43 thereof is caused to axially project or retract, then the link lever 35 is driven to turn clockwise or counterclockwise of the drawing about the pivotal pin 37 on the bracket 36 and, as a consequence, the shaft 23 is axially moved toward or away from the movable column 12 through the engagement between the link lever 35 and the flanged end portion of the shaft 23. As the shaft 23 is thus moved fowardly or backwardly through the bore 15 in the hollow shaft 14, the link arms 29 forming part of the collapsible cage 32 are caused to turn about the pivotal pins 31 on the radial projections 27 on the disc member 25 toward or away from the axis of the shaft 23 so that the bead retaining members 20 are radially moved inwardly or outwardly in the radial grooves 19 in the disc member 17. The mechanism composed of the disc member 17 on the hollow shaft 14, the collapsible cage 32, the shaft 23, the link lever 35 and the fluid-operated cylinder 40 constitutes means to hold the bead B in the shown apparatus.

The hollow shaft 14 further carries on its portion adjacent to the grooved circular disc member 17 a generally circular stiffener receiving disc member 45 which is keyed or otherwise securely connected as at 46 to the hollow shaft 14 and which is thus rotatable with the hollow shaft. The stiffener receiving disc member 45 has an annular outer portion 47 which is rearwardly inclined from a vertical plane radially outwardly from the outer perimeter of the collapsible cage 32, or in other words, from the curved outer peripheral edges of the bead retaining members 20 and which has a radially inner perimeter extending at a close spacing from the outer peripheral edges of the bead retaining members 20, as illustrated. The radially inclined annular outer portion 47 has a flat surface on the side of the collapsible cage 32 and has a width which is appropriately larger than the width of a stiffener to be applied to the bead B.

The stationary column 11 supports on its top wall an electric motor 48 having an output shaft 49 which carries a sprocket wheel 50. On the other hand, the hollow shaft 14 carries on its axial end portion projecting out of the rearmost end of the bore 13 in the stationary column 11 a sprocket wheel 51 which is keyed or otherwise securely connected as at 52 to the hollow shaft 14. An endless chain 53 is passed on these two sprocket wheels 50 and 51 so that the driving torque produced by the motor 48 is transmitted through the sprocket wheel 50, the endless chain 53 and the sprocket wheel 51 to the hollow shaft 14 and, through the hollow shaft 14, drives the collapsible cage 32 and the stiffener receiving disc member 45 to rotate about the axis of the hollow shaft 14. The torque transmission mechanism thus composed of the chain and sprocket arrangement may be substituted by any other form of known power transmission means such as for example a belt and pulley arrangement or a combination of gears, where desired.

On the other hand, the movable column 12 has a pair of brackets 54 on the lower portion of its front wall and a pair of brackets 54' on the lower portion of its rear wall. The brackets 54 and 54' are directed downwardly of the column 12 and carry rollers 55 and 55' through shafts 56 and 56', respectively. The two pairs of rollers 55 and 55' are in rolling engagement with a pair of spaced parallel rails, only one of which is seen in FIG. 1 as indicated at 57. The rails 57 are fast on a bottom wall 10a of the base structure 10 and are directed in parallel to the extension of the common axis of rotation of the shafts 14 and 23 on the stationary column 11. To the bottom wall 10a of the base structure 10 is further fixed a bracket 58 on which a fluid-operated cylinder 59 is rockably supported at its longitudinally intermediate portion through a pivotal pin 60. The fluid-operated cylinder 59 has a piston rod 61 whch extends into a space between the bottom wall of the movable column 12 and the bottom wall 10a of the base structure 10. The movable column 12 carries on its bottom wall a bracket 62 to which the piston rod 61 of the cylinder 59 is connected through a pivotal pin 63. When, thus, the fluid-operated cylinder 59 is actuated so that the piston rod 61 is axially caused to project forward or retract backward, the movable column 12 is driven to move on the rails 57 toward or away from the stationary column 11.

The movable column 12 is formed with a bore 64 which is aligned with the bore 13 in the stationary column 11. A shaft 65 extends throughout this bore 64 and is rotatably supported on the column 12 through bearings 66 and 66'. The shaft 65 has an axis of rotation which is in line with the common axis of rotation of the hollow shaft 14 and the shaft 23 on the stationary column 11. The shaft 65 has an axial end portion projecting out of the foremost end of the bore 64 in the column 12 and terminating in the vicinity of the leading end of the shaft 23 on the stationary column 11 as shown. The shaft 65 carries at its leading end a circular disc member 67 which is fixed to the shaft 65 by suitable fastening means such as a combination of a key 68 and a locking nut 69. The circular disc member 67 is formed with a number of radial projections 70 which are substantially equiangularly spaced apart from each other. The radial projections 70 of the disc member 67 have radially outer portions which are curved or bent toward the outer perimeter of the previously described collapsible cage 32 or, more specifically, the curved and grooved outer peripheral edges of the bead retaining members 20. The curved or bent outer portions of the projections 70 have respective outer ends describing a circle which has a center on an extension of the axis of the shaft 65 and which has a diameter appreciably larger than the diameter of the outer perimeter of the collapsible cage 32. When the movable column 12 is driven to move to a position closest to the stationary column 11 by means of the fluid-operated cylinder 59, the outer ends of the radial projections 70 of the disc member 67 are located in proximity to and appreciably radially outwardly spaced apart from the outer peripheral edges of the bead retaining members 20 as seen in FIG. 1. The disc member 67 having the radial projections 70 thus arranged constitutes a non-collapsible cage 71.

Figure 3:
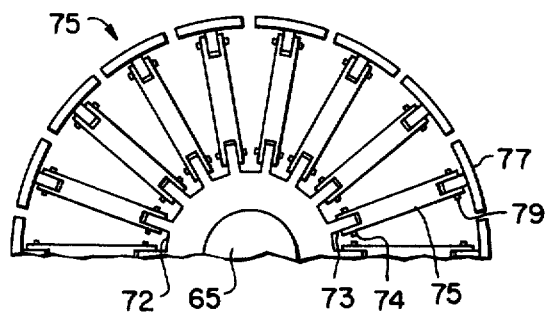
FIG. 3 is a rear end view showing an upper half of part of the strip transfer means of the embodiment of FIG. 1 as viewed from a position indicated by lines III—III of FIG. 1.

The shaft 65 projecting from the bore 64 in the movable column 12 further carries behind the non-collapsible cage 71 a circular disc member 72 which is rotatable with and axially movable on the shaft 65. The circular disc member 72 is formed with a number of radial projections 73 which are substantially equiangularly spaced apart from each other as will be better seen in FIG. 3 and which are equal in number to the radial projections 70 forming part of the above mentioned non-collapsible cage 71. The radial projections 73 of the circular disc member 72 are respectively connected through pivotal pins 74 to link arms 75 which are also substantially equiangularly spaced apart from each other as seen in FIG. 3. The link arms 75 are curved or bent toward the radially outer end portions of the radial projections 70 of the non-collapsible cage 71 as seen in FIG. 1. The link arms 75 have radially outer ends describing a circle which has a center located on the axis of rotation of the shaft 65. The disc member 72 having the radial projections 73 and the link arms 75 thus arranged constitute as a whole a collapsible cage 76 which is collapsible toward or extendible away from the shaft 65.

The collapsible cage 76 is combined with the non-collapsible cage 71 through a number of stiffener support members 77 which are circumferentially equidistantly spaced apart from each other. Each of the stiffener support members 77 is connected at one end to the radially outer end portion of each of the radial projections 70 of the non-collapsible cage 71 through a pivotal pin 78 and at the other end to the radially outer end portion of each of the link arms 75 of the collapsible cage 76 through a pivotal pin 79. The stiffener support members 77 are adapted to carry on their outer faces a continuous loop of stiffener S and are rotatable about the pivotal pins 78 between first angular positions substantially parallel to the axis of the shaft 65 as shown and second angular positions substantially parallel to the inclined ananular outer portion 47 of the previously described stiffener receiving disc member 45 (see FIG. 7). For the reason to be described later, each of the stiffener support members 77 has formed on its outer face a frictionable portion 80 which may be roughly finished, striated, formed with minute proturberances or, as shown, finely ribbed. Each of the stiffener support members 77 has an arcuately curved cross section so that, when held in the above mentioned first positions, the support members 77 as a whole constitute a generally cylindrical configuration having an axis in line with the axis of rotation of the shaft 65 as will be seen in FIG. 3.

The circular disc member 72 forming part of the collapsible cage 76 has an axial projection or boss 81 formed with a circumferential groove 82. A link lever 83 is slidably received at one end in this circumferential groove 82 and connected at the other end to a bracket 84 through a pivotal pin 85, the bracket 84 being rigidly secured to the bottom portion of the front wall of the movable column 12. The movable column 12 has a lower half portion which is internally formed with a chamber 86 which is open to the outside through an opening 87 formed in the front end wall of the column 12 in the vicinity of a longitudinally intermediate portion of the link lever 83. A fluid-operated cylinder 88 projects out of the chamber 86 through the opening 87 and is rockably supported by a bracket 89 through a pivotal pin 90, the bracket 89 being shown to be secured to the inner face of the front end wall of the movable column 12. The fluid-operated cylinder 88 has a piston rod 91 connected at its leading end to the longitudinally intermediate portion of the link lever 83 through a pivotal pin 92. When the fluid-operated cylinder 88 is actuated so that the piston rod 91 thereof is caused to axially project or retract, then the link lever 83 is driven to rotate clockwise or counterclockwise of the drawing about the pivotal pin 85 on the bracket 84 and, as a consequence, the disc member 72 of the collapsible cage 76 is axially moved on the shaft 65 toward or away from the disc member 67 of the non-collapsible cage 71 through engagement between the link lever 83 and the circumferentially grooved boss 81 which is integral with the disc member 72. As the disc member 72 is thus axially moved on the shaft 65 toward or away from the disc member 67 of the non-collapsible cage 71, the link arms 75 pivotally connected to the radial projections 73 of the disc member 72 are caused to turn about the pivotal pins 74 toward or away from the shaft 65 so that the stiffener supporting members 77 are rotated about the pivotal pins 78 from the previously mentioned first angular positions seen in FIG. 1 to the previously mentioned second angular position seen in FIG. 6 or vice versa. The mechanism composed of the shaft 65, the non-collapsible cage 71, the collapsible cage 76, the stiffener support members 77, the link lever 83 and the fluid-operated cylinder 88 constitutes means to transfer the stiffener S to the previously described stiffener receiving disc member 45.

The movable column 12 supports on its top wall an electric motor 82 having an output shaft 93 which carries a sprocket wheel 94. On the other hand, the shaft 65 supported on the movable column 12 carries on its axial end portion projecting out of the rearmost end of the bore 64 a sprocket wheel 95 which is keyed or otherwise securely connected as at 96 to the shaft 65. An endless chain 97 is passed on the sprocket wheels 94 and 95 so that the driving torque produced by the motor 92 is transmitted through the sprocket wheel 94, the endless chain 97 and the sprocket 95 to the shaft 65 and, through the shaft 65, to the cages 71 and 76 and the stiffener support members 77 so that the cages 71 and 76 and the support members 77 are driven to rotate in a single unit about the axis of the shaft 65. Where desired, the torque transmission mechanism composed of the chain and sprocket arrangement may be replaced with any other form of known power transmission means such as a belt and pulley arrangement or a combination of gears.

Figure 4:
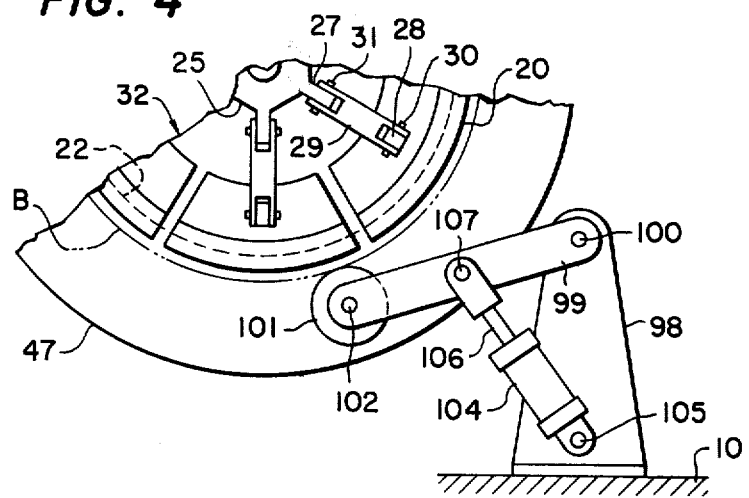
FIG. 4 is a front end view showing the pressing means incorporated into the embodiment of FIG. 1 and part of the bead holding means and the strip transfer means illustrated in FIG. 2.
Figure 5:
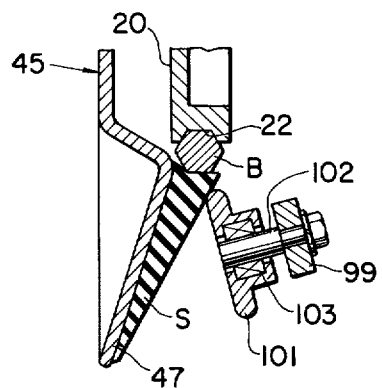
FIG. 5 is a fragmentary sectional view illustrating the pressing means in an operative condition engaging the strip receiving means of the embodiment shown in FIG. 1.

The base structure 10 further carries thereon a bracket 98 (FIG. 4) which is, though not shown in FIG. 1, located in the vicinity of the front face of the inclined annular outer portion 47 of the stiffener receiving disc member 45. As illustrated in FIG. 4, a rockable arm 99 is connected at one end to this bracket 98 through a pivotal pin 100 and carries at the other end a pressing roller 101 through a pin 102 which is received in a bearing 103 (FIG. 5). The rockable arm 99 is rotatable about the pivotal pin 100 between a first angular position having the pressing roller 101 disengaged from the stiffener receiving member 45 as seen in FIG. 1 and a second angular position in which the pressing roller 101 is in pressing engagement at its rim with the stiffener S bearing against the front face of the annular outer portion 47 of the stiffener receiving member 45 as seen in FIGS. 4 and 5 when the stiffener support member 77 (FIG. 1) are moved to the previously mentioned second angular positions thereof and the stiffener S has its radially inner edge in close contact with the outer peripheral edge of the bead B, as will be described in more detail. The rockable arm 99 is driven to move between the above mentioned first and second angular positions by means of a fluid-operated cylinder 104 (see FIG. 4). The fluid-operated cylinder 104 is connected at one end to the bracket 98 through a pivotal pin 105 and has a piston rod 106 which is connected at its leading end to a longitudinally intermediate portion of the rockable arm 99 through a pivotal pin 107. The rockable arm 99 is thus moved from the first angular position to the second angular position or vice versa when the cylinder 104 is actuated so that the piston rod 106 thereof is caused to project forward or retract backward.

Figure 6:
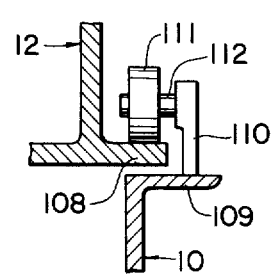
FIG. 6 is a cross sectional view taken on line VI—VI of FIG. 1.

To prevent the movable column 12 from floating over or vertically raised from the rails 57 when the column 12 is moved forwardly or backwardly on the rails, means may be provided so as to limit the upward movement of the column 12 over the base structure 10, a preferred example of such means being illustrated in FIG. 6. Referring to FIG. 6, the bottom wall of the movable column 12 has a pair of horizontal axis extensions 108 extending throughout the length of the bottom wall and the base structure 10 has a pair of horizontal side extensions 109 extending in proximity to and substantially coextensive with the side extensions 108 of the movable column 12. A bracket 110 is mounted on each of the side extensions 109 of the base structure 10 and carries a roller 111 through a shaft 112 having an axis perpendicular to the direction of movement of the movable column 12. The roller 111 is in rolling contact with the side extension 108 of the bottom wall of the column 12 so that the column 12 is prevented from being upwardly moved away from the side extensions 109 of the base structure 10. Although only one roller 111 is shown mounted on each side of the movable column 12, two or more rollers may be mounted on each of the side extensions 108 of the movable column 12, where desired.

The operation to apply the stiffener to the annular bead in the apparatus thus constructed and arranged will now be described with concurrent reference to FIGS. 1 to 7.

When the apparatus embodying the present invention is held at rest, the fluid-operated cylinder 59 is maintained in a condition having the piston rod 61 kept forwardly projected so that the movable column 12 is held in a position remotest from the stationary column 11. Under these conditions, the fluid-operated cylinder 40 in the stationary column 11 is in a condition having its piston rod 43 retracted so that the link lever 35 is in an angular position having its leading end located closest to the rearmost end of the hollow shaft 14. The shaft 23 extending through the hollow shaft 14 is consequently held in a forwardly projected axial position so that the link arms 29 are turned about the pivotal pins 31 into angular positions closest to the axis of the shaft 23 and accordingly the bead retaining members 20 are held in radial positions closest to the axis of the shaft 23. The collapsible cage 32 is thus held in a condition in which the outer perimeter thereof has a minimum diameter. On the other hand, the fluid-operated cylinder 88 in the movable column 12 is also held in a condition having its piston rod 91 retracted so that the link lever 83 is in an angular position having its leading end located closest to the front end wall of the movable column 12. The disc member 72 on the shaft 65 is consequently held in an axial position remotest from the leading end of the shaft 65 so thtat the stiffener support members 77 are maintained in the previously mentioned first angular positions providing as a whole a generally cylindrical configuration about an extension of the axis of the shaft 65 as seen in FIG. 1. The fluid-operated cylinder 104 shown in FIG. 4 is held in a condition having its piston rod 106 retracted so that the rockable arm 99 is turned about the pivotal pin 100 into the previously mentioned first angular position having the roller 101 moved away from the stiffener receiving disc member 45 as seen in FIG. 1.

Before starting the apparatus thus conditioned, a preliminarily prepared bead B of a continuous loop form is manually or automatically fitted in the circumferential grooves in the outer peripheral edges of the bead retaining members 20 of the collapsible cage 32 which is in a radially contracted condition. The fluid-operated cylinder 40 in the stationary column 11 is then actuated to cause the piston rod 43 project forward. The link lever 35 is consequently turned counterclockwise of FIG. 1 about the pivotal pin 37 so that the shaft 23 extending through the hollow shaft 14 is axially moved backward or away from the movable column 12. The link arms 29 pivotally connected to the disc member 25 carried on the shaft 23 are turned about the pivotal pins 31 and are thus raised away from the axis of the shaft 23 into the shown angular positions with the result that the bead retaining members 20 are radially moved through the radial grooves 19 in the disc member 17 away from the axis of the shaft 23. The outer perimeter of the collapsible cage 32 now has a maximum diameter and, as a consequence, the annular bead B carried on the bead retaining members 20 is maintained sufficiently taut.

A preliminarily prepared stiffener S of a continuous line form is then secured at one end to the curved upper face of one of the stiffener support members 77 and thereafter the motor 92 on the movable column 12 is actuated to drive the non-collapsible cage 71 and the collapsible cage 76 to rotate a single turn about the axis of the shaft 65. In this instance, the driving torque of the motor 92 is transmitted to the cages 71 and 76 through the sprocket wheel 94 on the output shaft 93 of the motor 92, the endless chain 97, the sprocket wheel 95 on the shaft 65 and the shaft 65. The cages 71 and 76 being thus turned a single turn about the axis of the shaft 65, the stiffener S is now lapped in a generally cylindrical form on the outer faces of all the stiffener support members 77, viz., around the entire circumference of the cylindrical configuration constituted by the curved outer faces of the stiffener support members 77. The stiffener S usually has a triangular cross section as will be best seen in FIGS. 5 and 7 and is lapped on the stiffener support members 77 with its thickened peripheral edge located close to the outer perimeter of the collapsible cage 32 as seen in FIG. 1. The stiffener S thus mounted on the stiffener support members 77 is then cut to form a single loop and is connected in a suitable manner to the initial end of the stiffener which has been secured to one of the support members 77. A continuous loop of stiffener S is now wrapped in a generally cylindrical form on the stiffener support members 77 as indicated by full lines in FIG. 7. It has thus far been assumed that the stiffener S is mounted on the stiffener support members 77 after the bead B has been fitted on the bead retaining members 20. This is, however, merely by way of example and, thus, the stiffener S may be mounted on the stiffener support members S before or simultaneously when the bead B is fitted on the bead retaining members 20, where desired.

Figure 7:
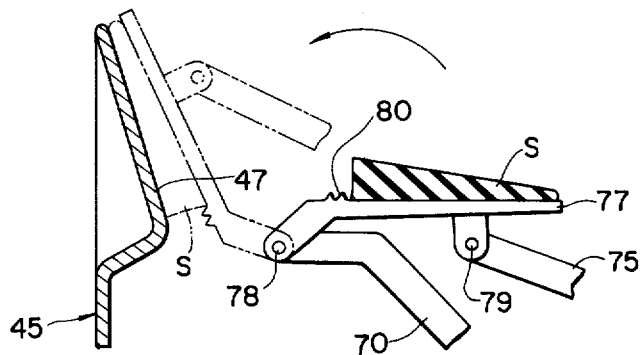
FIG. 7 is a fragmentary sectional view which illustrates the two different angular positions of the support member forming part of the strip transfer means of the embodiment shown in FIG. 1.

The fluid-operated cylinder 59 on the base structure 10 is then actuated to cause the piston rod 61 to retract backward so that the movable column 12 is driven to move on the rails 57 to a position closest to the stationary column 11. The radially outer ends of the radial projections 70 of the disc member 67 constituting the non-collapsible cage 71 are now located in proximity to and appreciably radially spaced apart from the outer perimeter of the collapsible cage 32 carrying the annular bead B. The fluid-operated cylinder 88 in the movable column 12 is then actuated to cause the piston rod 91 forwardly project to turn the link lever 83 counterclockwise of FIG. 1 about the pivotal pin 85. The disc member 72 on the shaft 65 supported on the movable column 12 is consequently axially moved toward the leading end of the shaft 65 so that the link arms 75 pivotally connected to the radial projections 73 of the disc member 72 are caused to turn about the pivotal pins 74 and are consequently raised away from the axis of the shaft 65. This causes the stiffener support members 77 to turn about the pivotal pins 78 on the radial projections 70 of the non-collapsible cage 71 into the previously mentioned second angular positions which are indicatd by phantom lines in FIG. 7. When thus moved to the second angular positions, the upper faces of the stiffener support members 77 are in closely face-to-face relation to the front face of the annular outer portion 47 of the stiffener receiving disc member 45 with an outer face of the stiffener S in close contact with the annular outer portion 47 of the stiffener receiving disc member 45, as seen in FIG. 7. The stiffener S which has been initially lapped on the stiffener support members 77 in a generally cylindrical form as indicated in FIG. 8a is now deformed into a generally annular form having a thickened inner peripheral edge received on the outer peripheral edge of the annular bead B as indicated in FIG. 8b. Since, in this instance, the annular outer portion 47 of the stiffener receiving disc member 45 is radially rearwardly inclined from a vertical plane and furthermore the stiffener support members 77 are held as a whole in a generally cylindrical form having ax axis in line with the axis of the shaft 65 as previously mentioned, each of the stiffener support members 77 is turned about the pivotal pin 78 through an angle larger than 90° so that the annular stiffener S received on the annular outer portion 47 of the stiffener receiving disc member 45 is radially inclined from a vertical plane as best seen in FIG. 7. The stiffener in such an inclined annular form is thus transferred from the stiffener support members 77 to the front face of the annular outer portion 47 of the stiffener receiving disc member 45. When the stiffener S is deformed from the generally cylindrical configuration shown in FIG. 8a into the generally annular configuration illustrated in FIG. 8b, the diameter D1 (FIG. 8a) of the stiffener S of the cylindrical form is reduced at the thickened circumferential edge of the stiffener by reason of the elasticity of the stiffener so that the diameter D2 (FIG. 8b) of the thickened inner peripheral edge of the stiffener S in the annular form is smaller than the diameter D1. As a consequence, the annular stiffener S which has been transferred to the front face of the annular outer portion 47 of the stiffener receiving disc member 45 tends to be radially contracted on the bead B and is, for this reason, closely joined at its thickened inner peripheral edge to the outer peripheral edge of the annular bead B carried on the grooved bead retaining members 20 of the collapsible cage 32, as seen in FIG. 5. In case the diameter D2 of the inner peripheral edge of the stiffener S of the generally annular form is substantially equal to the diameter D1 of the stiffener S of the initial cylindrical form, the stiffener S will also be closely joined to the bead B by reason of an internal stress produced in the stiffener as a result of the deformation thereof. If, furthermore, the inside diameter D2 of the stiffener S of the annular configuration happens to be larger than the inside diameter D1 of the stiffener S of the cylindrical form for one reason or another, the tendency of the annular stiffener S being radially contracted will be the more pronounced so that the stiffener S will be readily and closely joined to the bead B. When the stiffener support members 77 are being turned about the pivotal pins 78 from the first angular positions to the second angular positions, the stiffener S is kept closely attached to the outer faces of the stiffener support members 77 and is thus prevented from being dislodged from the support members or dislocated locally or in its entirety from its initial position of the support members by reason of the frictionable portion 80 which is formed on the outer face of each of the stiffener support members 77.

The fluid-operated cylinder 88 in the movable column 12 is then actuated to retract the piston rod 91 from the extended axial position so as to cause the link lever 83 to turn clockwise of FIG. 1 about the pivotal pin 85. The disc member 72 on the shaft 65 is consequently axially driven to move way from the leading end of the shaft 65 so that the link arms 75 pivotally connected to the radial projections 73 of the disc member 72 are radially turned about the pivotal pins 74 and accordingly the stiffener support members 77 are turned about the pivotal pins 78 from the second angular positions to the first angular positions shown. The fluid-operated cylinder 59 on the base structure 10 is thereafter actuated to cause the piston rod 61 to project forward so that the movable column 12 is moved on the rails 57 away from the stationary column 11. The stiffener support members 77 are now ready to be wrapped with another piece of stiffener of a cylindrical configuration.

The assembly of the bead B and the stiffener S thus joined together may be removed as it is from the bead retaining members 20 by moving the bead retaining members 20 radially inwardly on the disc member 17, if the connection between the bead B and the stiffener S is sufficiently close and stable. Where, however, it is found that the connection between the bead B and the stiffener S is not sufficiently secure or it is desired for another reason to add to the coherence between the bead B and the stiffener S, the stiffener S may be positively pressed at its entire inner peripheral edge onto the bead B while the stiffener S is resting on the stiffener receiving disc member 45. For this purpose, the fluid-operated cylinder 104 shown in FIG. 4 is actuated to cause the piston rod 106 thereof to project forward and move the rockable arm 99 from the previously mentioned first angular position into the second angular position in which the pressing roller 101 carried by the rockable arm 99 is brought into pressing engagement at its rim with the thickened inner peripheral edge of the stiffener S which is joined to the bead B, as seen in FIGS. 4 and 5. The motor 48 on the stationary column 11 is then started to drive the hollow shaft 14 through the sprocket wheel 50 on the output shaft 49 of the motor 48, the endless chain 48, and the sprocket wheel 51 on the hollow shaft 14. The collapsible cage 32 carrying the bead B on the bead retaining members 20 and the stiffener receiving disc member 45 receiving the stiffener S on its annular outer portion 47 are thus rotated together about the axis of the hollow shaft 14 with the pressing roller 101 in pressing and rolling contact with the thickened inner peripheral edge of the stiffener S. When the stiffener S is in this manner sufficiently securely joined to the bead B along its entire inner peripheral edge, the motor 48 is stopped to bring the collapsible cage 32 to a standstill.

The fluid-operated cylinder 104 (FIG. 4) is then actuated to cause the piston rod 106 to retract and move the rockable arm 99 from the second angular position to the first angular position having the pressing roller 101 moved away from the stiffener receiving disc member 45 as shown in FIG. 1. The fluid-operated cylinder 40 in the stationary column 11 is thereafter actuated to cause the piston rod 43 to retract backward so that the link lever 35 is caused to turn clockwise of FIG. 1 about the pivotal pin 37 and accordingly the shaft 23 extending through the hollow shaft 14 is driven to axially move toward the shaft 65 on the movable column 12. The link arms 29 pivotally connected to the radial projections 27 of the disc member 25 carried on the shaft 23 are consequently radially turned about the pivotal pins 31 toward the axis of the shaft 23, causing the bead retaining members 20 to radially inwardly move along the radial grooves 19 in the disc member 17 on the hollow shaft 14. The assembly of the bead B and the stiffener S closely conjoined now becomes slackened on the bead retaining members 20 and can be readily removed from the bead retaining members 20 from the front of the collapsible cage 32.

A single and complete cycle of operation to have a stiffener applied to a bead in the apparatus embodying the present invention has been described. A number of assemblies of beads and stiffeners will be produced through repetition of such cycles.

While it has been assumed that the column 11 carrying the cage 32 and the stiffener receiving member 45 is held stationary and the column 12 carrying the cages 71 and 76 and the stiffener support members 77 is movable toward and away from the former, the columns 11 and 12 may be arranged conversely so that the column 12 is held stationary and the column 11 is movable toward and away from the column 12 which is held stationary, if desired. If otherwise desired, both of the columns 11 and 12 may be held stationary or movable toward each other. Since, moreover, the gist of the present invention consists in the combination of the means to hold the bead in an annular form, the means to hold the stiffener in a generally cylindrical form and transfer the stiffener in a generally annular form, and the means to receive the stiffener from the stiffener transfer means, the pressing mechanism shown in FIG. 4 may be dispensed with if preferred. Where the pressing mechanism is thus dispensed with the collapsible cage 32 and the stiffener receiving member 45 carried on the column 11 need not be arranged to be rotatable and, as such, all the means to drive them for rotation may also be dispensed with. If desired, an arrangement may be made so that the pressing roller 101 is driven to rotate about the axis of the shaft 23 with collapsible cage 32 and the stiffener receiving disc member 45 held stationary. Or otherwise, the hollow shaft 14 and the members carried thereon or the roller 101 may be driven to rotate about the axis of the shaft 23 by a human effort. Likewise, the cages 71 and 76 carried on the shaft 65 supported by the column 12 may be driven to rotate by a human effort without use of the motor 92 and the associated torque transmission arrangement.

What is claimed is:

1. An apparatus for applying an annular strip of elastic material to an outer peripheral edge of a continuous loop of bead to be incorporated into an automobile tire, comprising bead holding means having a generally circular outer perimeter which has a variable diameter and around which said bead is to be lapped in a generally circular form, strip transfer means including a number of support members which are positioned in a substantially coaxial relationship to said bead holding means and which are movable between first angular positions operable to carry the strip of elastic material in a generally cylindrical form and second angular positions operable to carry the strip in a generally annular form in the vicinity of the outer perimeter of the bead holding means conditioned to a predetermined diameter, said cylindrical form and said annular form having a common axis which is substantially in line with an axis of the outer perimeter of the bead holding means, and strip receiving means having an annular wall portion which has an inner peripheral extending substantially coaxially with and radially at a close spacing from said outer perimeter of the bead holding means and angled to be in proximity to and in a face-to-face relation to said support members in said second angular positions thereof for releasably receiving thereon the strip of the generally annular form from said support members with an inner peripheral edge of the strip in close contact with the outer peripheral edge of the bead on said bead holding means.

2. An apparatus as set forth in claim 1, in which said bead holding means comprises a shaft coaxial with said outer perimeter of the bead holding means and axially movable in both directions, a collapsible cage supported on said shaft and having an outer peripheral end constituting said outer perimeter of said bead holding means, said collapsible cage being radially extendible or contractable about said shaft as the shaft is axially moved in either direction, and drive means for driving said shaft to axially move in either direction over a desired distance for providing a desired diameter of said outer perimeter of said bead holding means.

3. An apparatus as set forth in claim 2, in which said collapsible cage comprises a first disc member substantially coaxial with said shaft and formed with a number of radial grooves, bead retaining members respectively radially movably received in said radial grooves and having respective outer peripheral edges to receive thereon the bead in said generally circular form, the outer peripheral edges of the bead retaining members constituting as a whole said outer perimeter of said bead holding means, a second disc member fixed to said shaft, and link arms each of which is pivotally connected at one radial end to each of said bead retaining members and at the other radial end to said second disc member and which is radially rotatable about said other radial end toward and away from said shaft whereby said bead retaining members are radially outwardly or inwardly moved on said first disc member so that the collapsible cage is, in its entirety, radially extended or contracted about said shaft when said shaft is driven by said drive means.

4. An apparatus as set forth in claim 3, in which each of said bead retaining members has formed in its outer peripheral edge a circumferential groove for receiving therein said bead in said generally circular form.

5. An apparatus as set forth in claim 1, in which said strip transfer means further include a shaft having an axis substantially in line with the axis of the outer perimeter of said bead holding means, a non-collapsible cage fixedly supported on said shaft and having an outer perimeter which is to be located in close proximity to and radially outwardly spaced apart from the outer perimeter of said bead holding means when said support members are in said second angular positions thereof, a collapsible cage axially movable on said shaft and radially extendible or contractable about the shaft as the collapsible cage is axially moved in either direction on the shaft, said collapsible cage having an outer perimeter which has a variable diameter which is substantially equal to the diameter of said outer perimeter of the non-collapsible cage when the collapsible cage is in a contracted condition and which is larger than the diameter of the outer perimeter of the non-collapsible cage when the collapsible cage is in an extended condition, each of said support members being pivotally connected at one end to the outer perimeter of said non-collapsible cage and at the other end to the outer perimeter of said collapsible cage so that the support members are in said first angular positions when said collapsible cage is in said contracted condition and in said second angular positions when the collapsible cage is in said extended condition, each of the support members in the second angular positions having a radially inner peripheral end located in close proximity to and radially outwardly spaced apart from said outer perimeter of said beading holding means and a radially outer peripheral end located in proximity to the outer perimeter of said annular wall portion of said strip receiving means, and drive means for driving said collapsible cage to axially move on said shaft in either direction for causing the collapsible cage to radially extend or contract about the shaft.

6. An apparatus as set forth in claim 5, in which said non-collapsible cage comprises a disc member fixed on said shaft and formed with a number of radial projections terminating at said outer perimeter of the non-collapsible cage and said collapsible cage comprises a disc member axially slidable on said shaft and link arms having respective radially outer ends constituting as a whole said outer perimeter of the collapsible cage and respective radially inner ends pivotally connected to the disc member of the collapsible cage, each of said support members being pivotally connected at one peripheral end to each of said projections of the non-collapsible cage and at the other to each of said link arms of the collapsible cage.

7. An apparatus as set forth in claim 1, in which each of said support members is formed with a frictionable portion to be in contact with an inner peripheral face of said strip of elastic material.

8. An apparatus as set forth in claim 1, in which said bead holding means comprise a shaft coaxial with said outer perimeter of the bead holding means and axially movable in both directions, a collapsible cage supported on said shaft and having an outer peripheral end to constitute said outer of said bead holding means, said collapsible cage being radially extendible or contractable about said shaft as the shaft is axially moved in either direction over a desired distance for providing a desired diameter of said outer perimeter of the bead holding means and in which said strip transfer means further include a shaft having an axis substantially in line with an axis of said shaft of the bead holding means, a non-collapsible cage fixedly mounted on said shaft of the strip transfer means and having an outer perimeter which is to be located in close proximity to and radially outwardly spaced apart from the outer peripheral end of said collapsible cage of said bead holding means when said support members are in said second angular positions thereof, a collapsible cage axially movable on said shaft of the strip transfer means and axially extendible or contractable about the shaft of the strip transfer means as the collapsible cage of the transfer means is axially moved in either direction on the shaft of the transfer means, said collapsible cage of the strip transfer means having an outer perimeter which has a variable diameter which is substantially equal to the diameter of the outer perimeter of said non-collapsible cage when the collapsible cage of the strip transfer means is in a contracted condition and which is larger than the diameter of the outer perimeter of the non-collapsible cage when the collapsible cage of the strip transfer means is in an extended condition, each of said support members being pivotally connected at one peripheral end to the outer perimeter of said non-collapsible cage and at the other peripheral end to the outer perimeter of said collapsible cage of the strip transfer means so that the support members are in said first angular positions when said collapsible cage the strip transfer means is in said contracted condition and in said second angular positions when the collapsible cage of the transfer means is in said extended condition, each of the support members in the second angular positions having a radially inner peripheral end located in close proximity to and radially outwardly spaced apart from said outer peripheral end of said collapsible cage of said bead holding means and a radially outer peripheral end located in proximity to the outer perimeter of said annular wall portion of said strip receiving means.

9. An apparatus as set forth in claim 1, further comprising pressing means including a pressing roller which has an inoperative condition disengaged from said strip receiving means and an operative condition which is in pressing and rolling contact with an inner peripheral portion of said strip of elastic material in said generally annular form whereby the strip of the annular form is pressed at its inner peripheral edge to the outer peripheral edge of said bead.

10. An apparatus as set forth in claim 9, in which said pressing means comprise a hollow shaft which is rotatable about an axis substantially in line with an axis of the outer perimeter of said bead holding means and which carries thereon said bead holding means and said strip retaining means so that the bead holding means and the strip receiving means are rotatable with said hollow shaft, means for driving said hollow shaft to rotate about its axis, and means to move said roller between said inoperative condition and said operative condition.

11. An apparatus as set forth in claim 10, in which said bead holding means comprise a shaft coaxially extending throughout said hollow shaft and axially movable in both directions, a first disc member fixedly and coaxially mounted on said hollow shaft and formed with an number of radial grooves, bead retaining members respectively radially movable received in said radial grooves and having respective outer peripheral edges to receive thereon the bead in said generally circular form, the outer peripheral edges of the bead retaining members constituting as a whole said outer perimeter of the bead holding means, a second disc member fixed to said shaft extending through said hollow shaft, and link arms each of which is pivotally connected at one radial end to each of said bead retaining members and at the other radial end to said second disc member and which is radially rotatable about said other radial end toward and away from the axis of said hollow shaft whereby said bead retaining members are radially outwardly or inwardly moved on said first disc member so that the outer perimeter of the bead holding means is extended or contracted about the axis of the hollow shaft when the shaft extending through the hollow shaft is axially moved in either direction.

12. An apparatus as set forth in claim 10, in which said strip receiving means comprise a generally circular disc member fixedly mounted on said hollow shaft and having an outer peripheral portion constituting said annular wall portion.

13. An apparatus as set forth in claim 11, in which said strip receiving means comprise a generally circular disc member fixedly mounted on said hollow shaft and having an outer peripheal portion constituting said annular wall portion and in which said strip transfer means further include a shaft having an axis substantially in line with the axis of said hollow shaft, a non-collapsible cage fixedly supported on said shaft of the strip transfer means and having an outer perimeter which is to be located in close proximity to and radially outwardly spaced apart from the outer peripheral edges of said bead retaining members when said support members are in said second angular positions thereof, and a collapsible cage axially movable on said shaft of the strip transfer means and radially extendible or contractable about the shaft of the transfer means as the collapsible cage is axially moved in either direction on the shaft, said collapsible cage having an outer perimeter which has a variable diameter which is substantially equal to the diameter of said outer perimeter of said non-collapsible cage when the collapsible cage is in a contracted condition and which is larger than the outer perimter of the non-collapsible cage when the collapsible cage is in an extended condition, each of said support members being pivotally connected at one end to the outer perimeter of said non-collapsible cage and at the other to the outer perimeter of said collapsible cage so that the support members are in said first angular positions when said collapsible cage is in said contracted condition and in said second angular positions when the collapsible cage is in said extended condition, each of the support members in the second angular positions having a radially inner peripheral end located in close proximity to and radially outwardly spaced apart from the outer peripheral edges of said bead retaining members and a radially outer peripheral end located in proximity to the outer perimeter of said circular disc member constituting said strip receiving means.

14. An apparatus as set forth in claim 1, in which said bead holding means and said strip receiving means are supported on a first support structure and said strip transfer means are supported on a second support structure, wherein said first and second support structures are movable relative to each other in a predetermined path which is parallel to substantially aligned axis of the bead holding means, theh strip transfer means and the strip receiving means.

15. An apparatus as set forth in claim 14, in which said first support structure is held stationary and said second support structure is movable toward and away from said first support structure along said path.

16. An apparatus as set forth in claim 15, further comprise a roller rotatable on a stationary shaft extending substantially at right angles to said path and in rolling contact at its lower circumferential end with an upper face of a horizontal member forming part of said second support structure whereby the second support structure is prevented from being raised from an initially predetermined vertical position.

17. A method of applying an annular strip of elastic material to an outer peripheral edge of a continuous loop of bead to be incorporated into an automobile tire, comprising holding said bead in a generally circular form, preparing a strip of elastic material in a generally cylindrical form having an axis substantially in line with an axis of said bead of the generally circular form, positioning one peripheral edge of said strip of the generally cylindrical form in close proximity to and radially outwardly spaced apart from the outer peripheral edge of said bead and causing the strip to turn about said one periheral edge of the strip through an angle larger than 90 degrees for deforming the strip into a generally annular form while restraining the annular strip from being further turned about the radially inner peripheral edge thereof whereby the annular strip of elastic material is radially contracted and closely pressed at its inner peripheral edge to the outer peripheral edge of said bead.

18. A method as set forth in claim 17, further comprising positively pressing an inner peripheral portion of said strip of the generally annular form onto the outer peripheral edge of said bead.

* * * * *